United States Patent
van den Berg (12)

(10) Patent No.: US 6,200,017 B1
(45) Date of Patent: Mar. 13, 2001

(54) IMPLEMENT FOR MIXING FODDER

(75) Inventor: Karel van den Berg, Bleskensgraaf (NL)

(73) Assignee: Maasland N.V. (NL)

( * ) Notice: Subject to any disclaimer, the term of this patent is extended or adjusted under 35 U.S.C. 154(b) by 0 days.

(21) Appl. No.: 09/282,283

(22) Filed: Mar. 31, 1999

Related U.S. Application Data

(63) Continuation of application No. PCT/NL98/00448, filed on Aug. 3, 1998.

(30) Foreign Application Priority Data

Aug. 7, 1997 (NL) .................................................. 1006734

(51) Int. Cl.$^7$ ..................................................... A01K 5/01
(52) U.S. Cl. ......................... 366/345; 366/346; 119/57.5; 119/349; 119/521; 119/902
(58) Field of Search .................... 366/345, 346; 119/449, 451, 516, 521, 51.01, 52.1, 57.2, 57.5, 902

(56) References Cited

U.S. PATENT DOCUMENTS

| | | | |
|---|---|---|---|
| 636,959 | * 11/1899 | Dornfeld | 366/346 |
| 2,281,212 | * 4/1942 | Stoltzfus . | |
| 2,481,995 | * 9/1949 | Godley | 366/345 |
| 2,895,720 | * 7/1959 | Koch et al. | 366/345 |

FOREIGN PATENT DOCUMENTS

| | | |
|---|---|---|
| 677 171 | * 4/1991 | (CH) . |
| 445 624 | * 12/1925 | (DE) . |
| 26 32 577 | * 2/1977 | (DE) . |
| 2 704 779 | * 11/1994 | (FR) . |
| 2 155 297 | * 9/1985 | (GB) . |

* cited by examiner

*Primary Examiner*—Tony G. Soohoo
(74) *Attorney, Agent, or Firm*—Penrose Lucas Albright

(57) ABSTRACT

An apparatus and method for mixing fodder with another consumable material wherein a hopper having two compartments is drawn by a tractor or similar vehicle or is self-propelled. Two parallel feeding channels are provided in front of a plurality of animal's stalls in a building and a tractor together with a hopper move between the two feeding channels. There is a discharge device from each of the compartments of the hopper which extend outwardly into the feed channels to receive fodder from one compartment and another consumable material from the other compartment which are mixed together by mixing devices extending outwardly into the feed channels behind the discharge devices. The mixing device is powered by a power take-off shaft from the tractor and rotates to mix the fodder and other consumable material together. The rotation may be about vertical axes or horizontal axes, the latter extending either in the direction of travel of the tractor or transverse thereto. The mixing devices may be guided by a rail disposed along an edge of the mixing channel. The tractor may contain a radiographic device for opening and closing doors to the building in which the stalls and feed channels are installed.

30 Claims, 3 Drawing Sheets

IMPLEMENT FOR MIXING FODDER

RELATED APPLICATION

This Application is a continuation of International Application No. PCT/NL98/00448, filed Aug. 3, 1998.

FIELD OF THE INVENTION

The invention relates to an apparatus and method for mixing fodder.

BACKGROUND OF THE INVENTION

Such apparatus are known and usually consist of a hopper which may be either stationary or transportable and in which two kinds of fodder can be mixed. Subsequently the mixed fodder can be conveyed to the place where it is consumed by the animals, such as cows.

These known apparatus have various disadvantages. One thereof is that the farmer has to perform two operations, i.e., first introducing the kinds of fodder into the mixing container and subsequently bringing the mixed fodder from the mixing container into the feed channel. Furthermore, it may sometimes be considered as a disadvantage that the known apparatus cannot be used properly for mixing not yet consumed fodder present in a feed channel with new fodder.

SUMMARY OF THE INVENTION

An objective of the invention is to provide an apparatus by means of which the fodder can be mixed in the stable or cowshed itself.

In accordance with the invention, the apparatus can be moved by a tractor or similar vehicle or propelled under its own power, while the apparatus comprises at least one driven mixing device by means of which, during moving of the vehicle, fodder disposed beside the vehicle can be mixed. According to a further inventive feature, the driven mixing device projects outwardly at the lateral side of the vehicle.

According to another aspect of the invention, the apparatus can be energized and propelled by a tractor or similar vehicle or by means of its own or a dedicated motor in a cowshed, while the apparatus includes a hopper for fodder and at least one mixing device for mixing the fodder present in the hopper with another quantity of fodder, said mixing device being located outside the hopper.

According to a further aspect of the invention, the apparatus comprises mechanically driven mixing devices for mixing the fodder in a feed channel, the apparatus including a sensor for determining the position of the mixing device relative to the feed channel. By means of this construction it is possible to determine the position of the mixing device either from the driver's seat of a tractor, or elsewhere.

The invention also relates to a method of mixing fodder, in which at least part of the fodder is supplied to a feed channel and is mixed in the feed channel by means of a mechanically driven vehicle.

BRIEF DESCRIPTION OF THE DRAWINGS

The invention will be explained in further detail with reference to a number of exemplary embodiments.

DETAILED DESCRIPTION OF THE PREFERRED EMBODIMENTS

Figure 1:
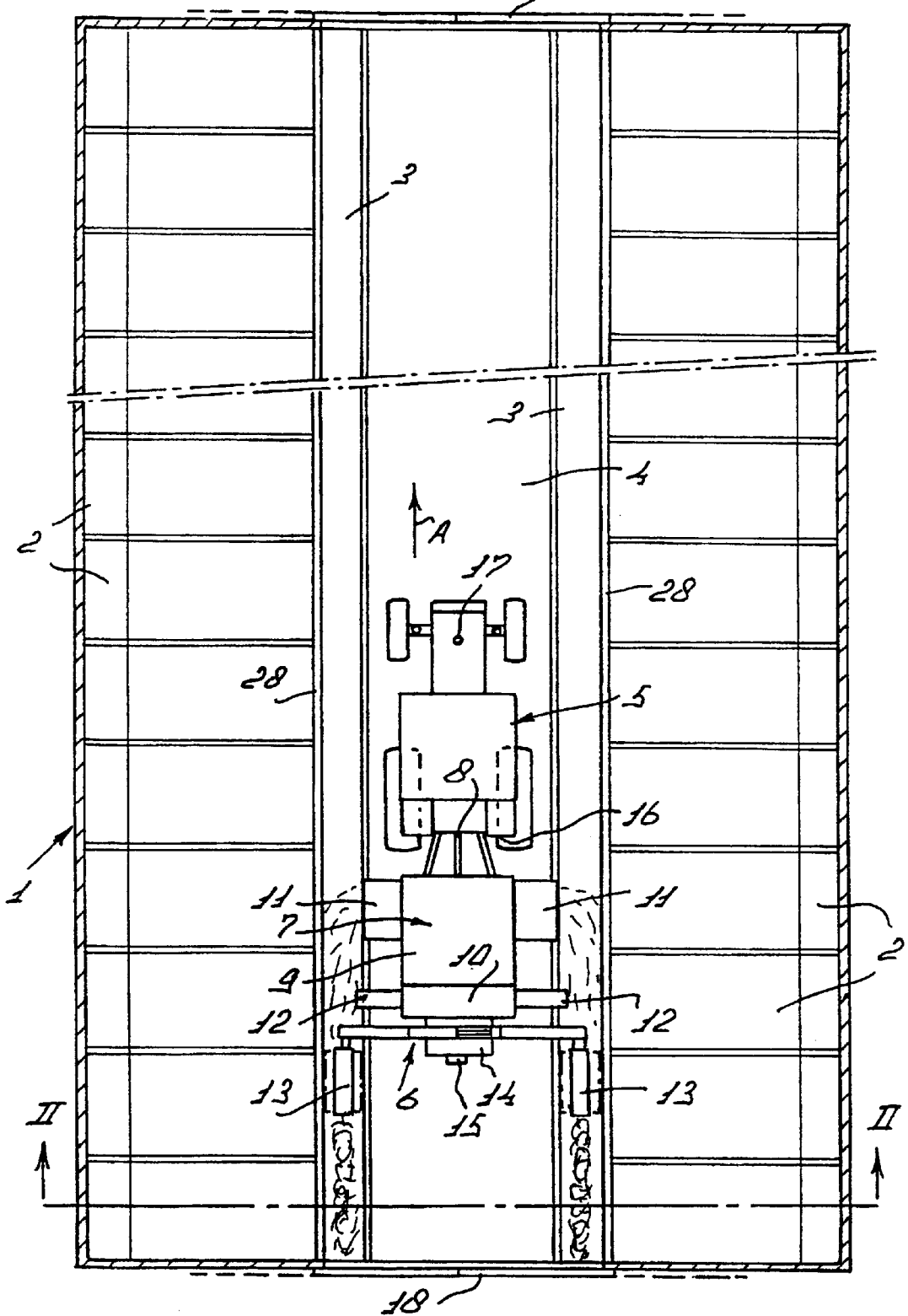
FIG. 1 is a plan view of the cowshed in which there is provided a mixing apparatus according to the invention.
Figure 2:
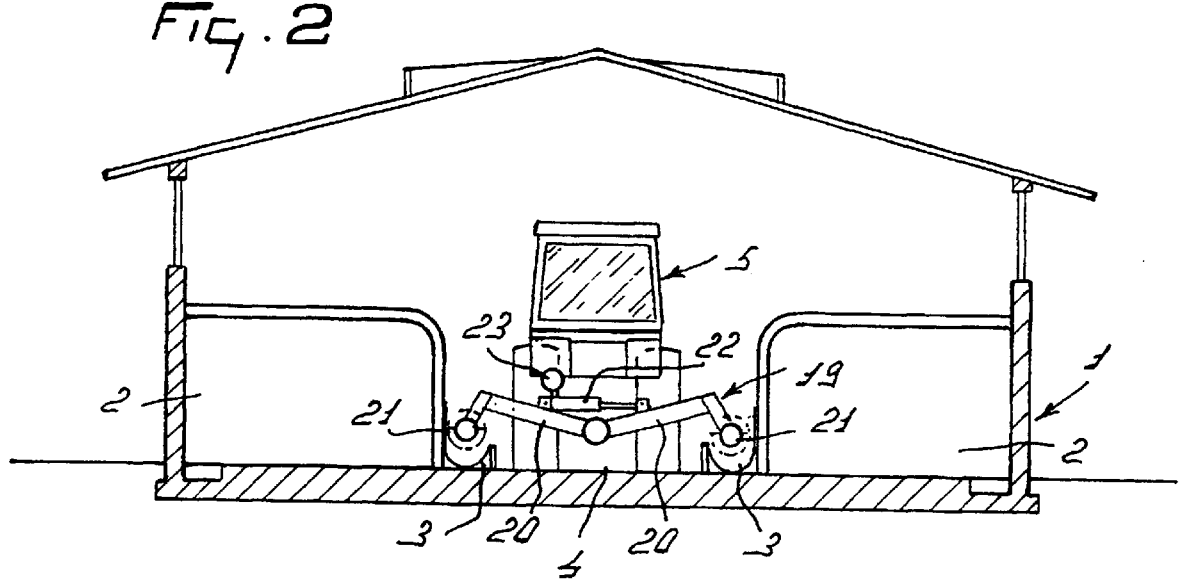
FIG. 2 is a cross-section of a cowshed of FIG. 1, providing a rear view of the mixing apparatus present therein according to a second embodiment.

The cowshed 1 according to FIGS. 1 and 2 comprises two rows of stalls 2 for cows or other farm animals. Along each row of stalls 2 a feed channel 3 is provided in which fodder is deposited, so that the cows can feed from fodder disposed in the feed channel. Between feed channels 3 a strip or center alley 4 is provided.

This strip or center alley 4 is normally used as a walking path which, among other things, is used for filling the feed channels, whether or not by means of a tractor.

In FIG. 1 a tractor 5 with a mixing apparatus 6 according to the invention is arranged on strip 4 in the cowshed.

Mixing apparatus 6 comprises a hopper 7 which is capable of being coupled to a lifting hitch of tractor 5 by means of a three-point coupling 8. Hopper 7 comprises two spaces, i.e., a space 9 for coarse fodder, such as hay, and a space 10 for other fodder, such as concentrate.

Space 9 has on both sides conveying means comprising a discharge device 11, such as a discharge belt, by means of which the fodder can be supplied from space 9 to feed channels 3. In the same manner, space 10 at the left and right side has a further conveying means that comprises a discharge device 12 by means of which the fodder is supplied from space 10 to feed channels 3. Mixing apparatus 6 further comprises two mixing devices 13 by means of which the fodder supplied to feed channels 3 is mixed. These mixing devices are driven by means of a power take-off shaft disposed at the rear side of hopper 7 via a transmission 14 and the power take-off shaft rotates about an axis 15 extending transversely to the direction of travel A. The power take-off shaft is driven in a manner well known in the art behind hopper 7 via the power take-off shaft of the tractor.

The drive may have means for altering the number of revolutions of the mixing devices. Additionally there may be provided means for stopping one of the mixing devices independently of the other. The apparatus may also have means for lifting the mixing devices from the feed channel and placing them into a transport position in which the total width of the devices is reduced so as to be within the permitted transport width of three meters.

Preferably the mixing devices are provided with a sensor so that the tractor driver can check from the tractor whether the mixing devices are correctly positioned.

In this embodiment the mixing apparatus is arranged at the rear side 16 of a tractor. However, it may also be desirable to dispose the mixing apparatus at the front side of the tractor when the tractor has a power take-off shaft and a lifting hitch at its front side.

The tractor may be provided with an aerial 17 for radiographically opening and closing of the doors 18 of the cowshed.

FIG. 2 shows the rear side of a mixing apparatus 19 according to the invention. The apparatus comprises two sidewardly projecting arms 20 to each of which is fitted a mixing device 21 which rotates about an axis extending horizontally in the direction of travel A of the apparatus. This mixing device 21 may be provided with a number of outwardly projecting tines. The mixing device is disposed in the feed channel with clearance relative to the side walls thereof.

The side walls and the bottom of the feed channel may be rounded off. The sideward adjustment of the devices may take place by means of a hydraulic piston and cylinder member 22 which is provided with an accumulator 23 for track correction. The adjustment may be operated from tractor 5.

The drive of the mixing devices is effected via a transmission from the power take-off shaft of the tractor.

Figure 3:
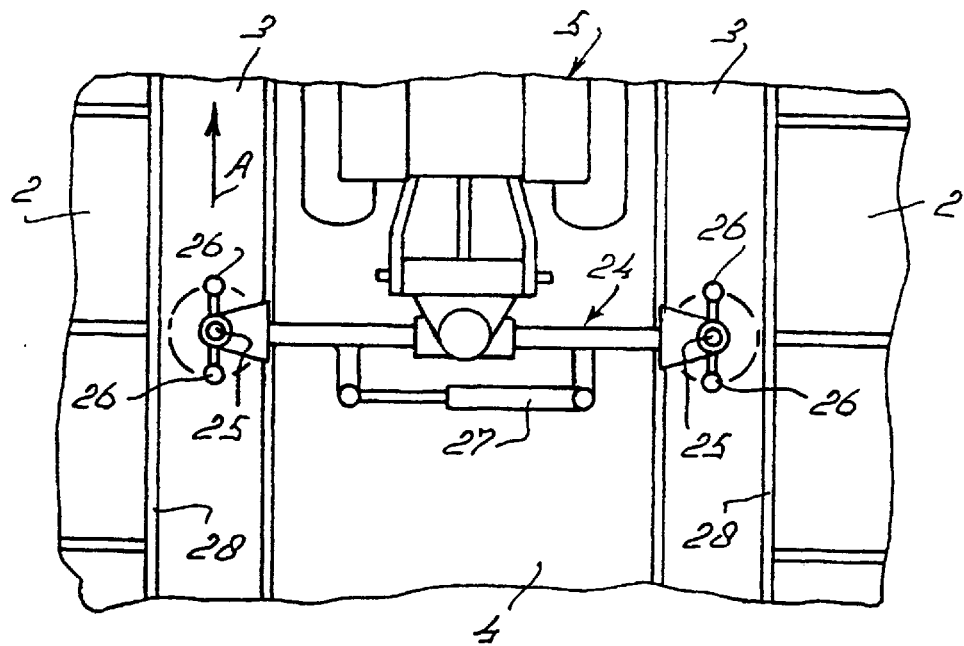
FIG. 3 is a fragmentary plan view of another embodiment in which mixing devices of the mixing apparatus rotate about upwardly directed axes.

In the embodiment of FIG. 3 the mixing apparatus 24 is coupled directly to the lifting hitch of tractor 5, although the mixing device may also be fastened optionally to a hopper, such as hopper 7.

In this situation mixing apparatus 24 has mixing devices 26 rotating about upwardly directed axes 25, the mixing devices 26 being provided with downwardly projecting tines.

Mixing devices 26 are driven about the upwardly directed axis via a transmission. Preferably mixing devices 26 rotate in opposite directions relative to each other. In this embodiment, for example, the farmer can supply by hand the new coarse fodder to the feed channel and the mixing apparatus mixes the new fodder with fodder still present in the feed channel.

Mixing apparatus 24 is provided with means 27 for changing the distance between the mixing devices. It is desirable that the wall 28 of the feed channel located at the side of stalls 2 be higher than the wall situated at the side of strip 4.

Figure 4:
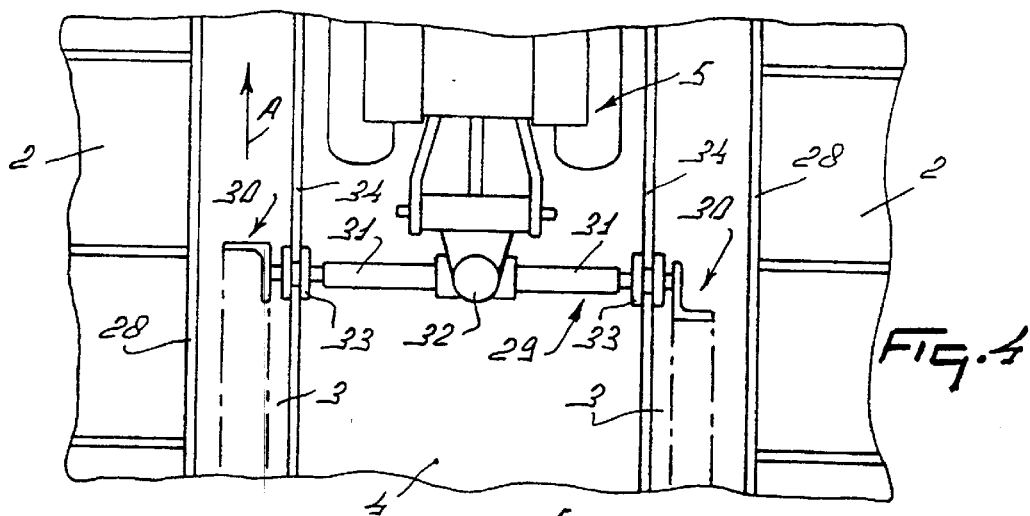
FIG. 4 is a further fragmentary plan view of another embodiment of the mixing devices of the mixing apparatus, which mixing devices each rotate about a horizontal axis.

The mixing apparatus 29 shown in FIG. 4 corresponds on a number of points to the mixing apparatus shown of FIG. 3 and corresponding parts are therefore indicated by the same reference numerals.

Mixing apparatus 29 comprises mixing devices 30 which rotate about a horizontal axis 31, preferably so that the lower side of the mixing device moves in the direction of travel A of tractor 5. The mixing devices 30 are coupled with the lifting hitch of tractor 5 via a transmission 32. To this transmission 32 there are fitted support wheels 33 bearing on rails 34 on the inside of the feed channels. In this embodiment support wheels 33 are capable of rotating freely, but optionally they could be driven as well in a modified construction.

Figure 5:
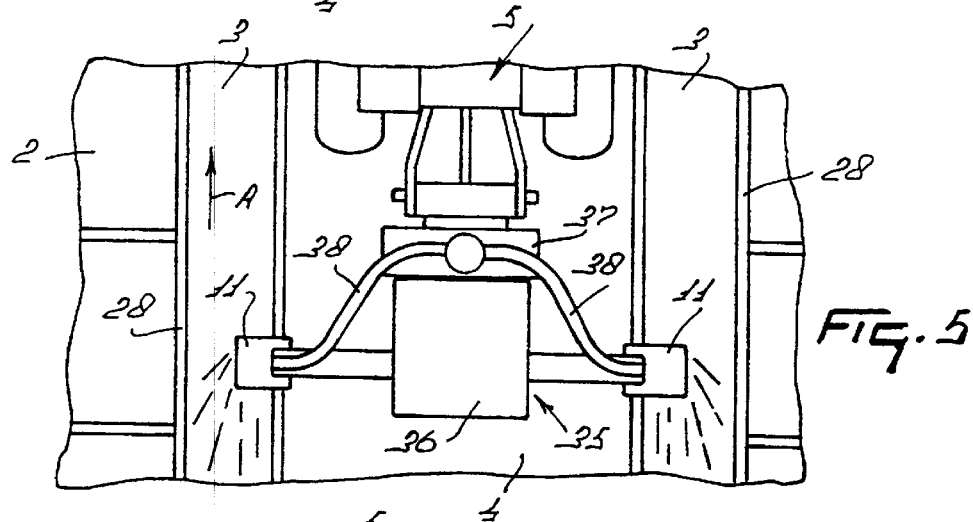
FIG. 5 is another fragmentary plan view of a further embodiment in which the mixing apparatus is suitable for mixing solid and liquid fodder.

In the embodiment of FIG. 5, liquid and solid fodder can be mixed.

FIG. 5 shows a mixing apparatus 35 provided with a hopper 36 for solid fodder and a tank 37 for liquid fodder, for example, a liquid containing minerals.

As described with reference to FIG. 1, the hopper 36 has discharge device 11, while tank 37 has discharge lines 38 discharging into discharge devices 11. In this manner the liquid fodder is mixed with the solid fodder. Mixing devices as described in the foregoing may optionally be disposed at the end of the discharge device.

Figure 6:
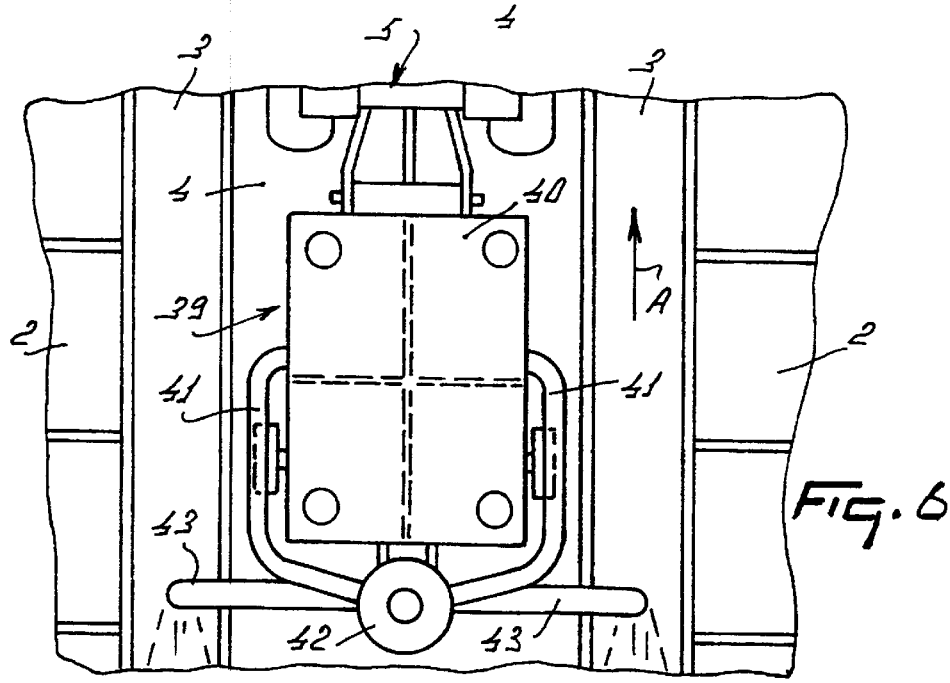
FIG. 6 is a still further fragmentary plan view of yet another mixing apparatus which includes a hopper for different types of fodder and with a mixing device arranged behind the hopper.

The embodiment of FIG. 6 shows a mixing apparatus 39 provided with a hopper 40 for different kinds of fodder. Via lines 41 the fodder is supplied to a mixing device 42 disposed at the rear side of hopper 40.

From mixing device 42, discharge lines 43 for supplying the mixed fodder from the mixing device 42 are provided to feed channels 3.

In discharge lines 43, transport means, such as a rotating displacing screw, may be provided for displacing the fodder in the line in the direction of the feed channel.

The invention is not restricted to the embodiments shown and elements of one embodiment may optionally be applied in another embodiment. Further, although I have disclosed the preferred embodiments of my invention, it is to be understood that it is capable of other adaptations and modifications within the scope of the following claims:

Having disclosed my invention, what I claim as new and to be secured by Letters Patent of the United States of America is:

1. An apparatus for mixing fodder, which comprises a vehicle to which is connected a driven mixing device by means of which, during moving of said vehicle, fodder lying in a feed channel beside said vehicle is mixed by said mixing device, said feed channel being open on its top to receive said mixing device and having sides configured to retain said fodder in said feed channel while said fodder is being mixed.

2. An apparatus in accordance with claim 1, wherein said driven mixing device projects at the lateral side of the vehicle.

3. An implement in accordance with claim 1, comprising at least two container means, each said container means containing fodder which is different in kind and quantity from the fodder in the other said container means, and conveying means for conveying fodder from each of said container means to a location where they will be mixed by said driven mixing devices.

4. An apparatus for mixing fodder comprising at least two container means for receiving different kinds and quantities of fodder, motor means for propelling the apparatus, and a mixing device which receives fodder from each of said container means, said mixing devices being located outside of said container means.

5. An apparatus in accordance with claim 4, in combination with a feed channel, said mixing device being mechanically driven and received in said feed channel, the apparatus including a sensor for determining the position of said mixing device relative to said feed channel.

6. An apparatus for mixing fodder comprising a mechanically driven mixing device, a feed channel for receiving said fodder, said mixing device received in said feed channel and a sensor for dtermining the position of said mixing device relative to said feed channel, said feed channel being open on its top to receive said mixing device and having sides to retain said fodder in said feeding channel while being mixed.

7. An apparatus in accordance with claim 6, comprising a further feed channel parallel to said first mentioned feed channel and a further said mechanically driven mixing device received in said further feed channel, the apparatus including a further sensor for determining the position of said further mixing device relative to said further feed channel, the apparatus further including two container means and conveying means therefrom for conveying fodder from said container means to each of said mixing devices.

8. An apparatus in accordance with claim 7, in combination with a vehicle which supports said two container means between said feed channels and moves said mixing devices in said feeding channels while fodder is being moved from said two container means via said conveyor means to said respective mixing devices.

9. An apparatus in accordance with claim 7, comprising control means for controlling the mixing speed of said mixing devices.

10. An apparatus for distributing and mixing fodder in two spaced-apart feed channels which comprises a tractor having a power take-off shaft, a pair of mixing devices interconnected to said power take-off shaft, container means for fodder attached to said tractor, fodder conveying means extending from said hopper to each of said feed channels, said mixing devices each mixing fodder in respective feed channels received from said hopper via said conveying means.

11. An apparatus in accordance with claim 10, comprising adjustment means for adjusting the distance between said mixing devices.

12. An apparatus in accordance with claim 11, comprising control means on said tractor for controlling said adjustment means.

13. An apparatus in accordance with claim 11, comprising adjustment means for adjusting the distance between said mixing devices to correspond to the distance between said two feed channels.

14. An apparatus in accordance with claim 11, wherein said mixing devices are rotatable about upwardly directed axes.

15. An apparatus in accordance with claim 10, wherein said mixing devices are rotatable about substantially horizontally extending axes.

16. An apparatus in accordance with claim 10, wherein said mixing devices are rotatable about axes extending at least substantially in the direction of operative travel of the apparatus.

17. An apparatus in accordance with claim 10, wherein each said mixing device is driven to rotate about an axis which extends transversely to the operative direction of travel of the apparatus.

18. An apparatus in accordance with claim 10, wherein rails are provided to extend along said feed channels, the apparatus comprising guide elements which are received by each said rail and which support said mixing devices.

19. An apparatus in accordance with claim 10, comprising a three-point trestle for attaching the apparatus to said tractor.

20. An apparatus in accordance with claim 10, wherein said container means comprises a hopper for fodder.

21. An apparatus in accordance with claim 20, wherein said conveying means comprises an outlet in said hopper through which fodder is conveyed to said feed channels.

22. An apparatus in accordance with claim 21, wherein said outlet, considered in the operative direction of travel of the apparatus, is located forwardly relative to said mixing devices.

23. An apparatus in accordance with claim 21, wherein said hopper comprises at least two compartments, each said compartment having at lease one outlet, said outlet of one said compartment being located in front of said outlet of the other said compartment considered in the operative direction of travel of the apparatus.

24. An apparatus in accordance with claim 10, wherein said container means comprises at least two compartments, said conveying means conveying fodder from said two compartments to said feed channels, said mixing device in each said feed channel mixing fodder received in said feed channels from said two compartments.

25. An apparatus in accordance with claim 10, comprising firt radiographic means, the apparatus being associated with a building wherein fodder is conveyed to feed channels which are in said building, said building comprising second radiographic means and doors which are responsive to said second radiographic means to be opened and closed, the apparatus further comprising control means associated with said first radiographic means for controlling the automatically opening and closing of said doors of said building.

26. A method of distributing and mixing fodder in an elongated feed channel which extends in front of a plurality of stalls for animals, the method comprising moving a hopper along said feed channel, conveying fodder from said hopper into said feed channel while moving said hopper along said feed channel, simultaneously conveying a consumable material distinct from said first mentioned fodder from said hopper into said feed channel while moving said hopper along said feed channel, and mixing said first mentioned fodder with said consumable material by means of a mechanically driven device received in said feed channel while moving said mechanical driven device together with said hopper along said feed channel.

27. An apparatus for mixing fodder which comprises a vehicle to which is connected a driven mixing device by means of which during moving of said vehicle, fodder lying in a feed channel beside said vehicle is mixed by said mixing device, at least two container means, each said container means containing fodder which is different in kind and quantity from the fodder in the other said container means, and conveying means for conveying fodder from each of said container means to a location where they will be mixed by said driven mixing device.

28. An apparatus for mixing fodder comprising a mechanically driven mixing device, a feed channel for receiving said fodder, said mixing device received in said feed channel and a sensor for determining the position of said mixing device relative to said feed channel, a further feed channel parallel to said first mentioned feed channel and a further said mechanically driven mixing device received in said further feed channel, a further sensor for determining the position of said further mixing device relative to said further feed channel, two container means and conveyor means therefrom for conveying fodder from said container means to each of said mixing devices.

29. An apparatus in accordance with claim 28, in combination with a vehicle which supports said two container means between said feed channels and moves said mixing device in said feed channels while fodder is being moved from one of said two container means via said conveyor means to said respective mixing devices.

30. An apparatus in accordance with claim 28 comprising control means for controlling the mixing speed of said mixing devices.

* * * * *